United States Patent [19]

Roberts et al.

[11] 4,381,998
[45] May 3, 1983

[54] RIGID FILTER PLATE AND PROCESS FOR MANUFACTURE OF THE SAME

[75] Inventors: Robert L. Roberts, St. Charles, Ill.; Felix G. Janssen, Ft. Lauderdale, Fla.

[73] Assignee: U.S. Environmental Products, Inc., St. Charles, Ill.

[21] Appl. No.: 296,956

[22] Filed: Aug. 27, 1981

[51] Int. Cl.³ .............................................. B01D 39/20
[52] U.S. Cl. ..................................... 210/503; 156/276; 156/279; 210/506; 210/510; 428/403
[58] Field of Search ................ 156/276, 279; 210/503, 210/504, 506, 510; 428/403

[56] References Cited

U.S. PATENT DOCUMENTS

| | | | |
|---|---|---|---|
| 421,238 | 2/1890 | Bush et al. | 210/510 |
| 1,081,573 | 12/1913 | Boeck | 210/510 |
| 1,117,601 | 11/1914 | Porter | 210/510 X |
| 1,844,528 | 10/1932 | Benner et al. | |
| 1,910,758 | 5/1933 | Dundore | 210/506 |
| 1,988,478 | 1/1935 | Broadwell et al. | 210/506 X |
| 2,155,016 | 4/1939 | Kershaw | |
| 2,293,099 | 8/1942 | Barnes et al. | |
| 2,303,629 | 12/1942 | Gelinas | 210/504 |
| 2,464,517 | 3/1949 | Kurtz | 210/510 X |
| 2,597,217 | 5/1952 | Zenick | 210/510 X |
| 2,732,078 | 1/1956 | Records | 210/510 |
| 3,011,643 | 12/1961 | McCoy | 210/169 |
| 3,056,704 | 10/1962 | Rothweiler et al. | |
| 3,166,615 | 1/1965 | Farrell | 264/23 |
| 3,615,019 | 10/1971 | Early, Jr. | 210/293 |
| 3,771,655 | 11/1973 | Hudson, Jr. | 210/108 |
| 3,847,808 | 11/1974 | Spohr | 210/271 X |
| 4,081,371 | 3/1978 | Yarwood et al. | 210/510 X |
| 4,088,576 | 5/1978 | Mott | 210/510 X |
| 4,186,100 | 1/1980 | Mott | 210/510 X |
| 4,190,534 | 2/1980 | Wyatt | 210/271 X |
| 4,340,478 | 7/1982 | Stannard et al. | 210/510 X |

OTHER PUBLICATIONS

"Filtros Underdrain Plates" Bulletin, from Filtros, Inc., East Rochester, NY, (dated 1963 or earlier).

Primary Examiner—Robert H. Spitzer
Attorney, Agent, or Firm—Allegretti, Newitt, Witcoff & McAndrews, Ltd.

[57] ABSTRACT

An improved rigid filter plate for sludge dewatering is comprised of a filter element of two or more sizes within the range of 8 to 100 grid of jagged, irregular hard particles of aluminum oxide or similar materials, and of a supporting element of larger particles all bonded with an adhesive bonding agent. The particles in the filtering element increase in average diameter progressing from the upper surface to the lower surface of the element. A process for manufacturing the improved rigid filter plate is also set forth.

39 Claims, 7 Drawing Figures

RIGID FILTER PLATE AND PROCESS FOR MANUFACTURE OF THE SAME

BACKGROUND OF THE INVENTION

1. Field of the Invention

The present invention relates to an improved rigid filter plate for sludge dewatering and to an improved method for making such a rigid filter plate.

Sludge treatment processes provide means to reduce the volume and moisture content of waste water sludge to yield an easily handleable, relatively dry sludge cake. Efforts directed toward improving existing sludge dewatering technology have not entirely overcome the inherent drawbacks of current filtration means. Many current filtration systems utilize loose sand or other nonbonded particulate matter as the filtering element. The filtering layer of loose sand does not possess the strength or durability of an adhesively bonded filtering element. Even those filter plates characterized by rigid surfaces are generally unable to withstand mechanized sludge cake removal by heavy equipment traversing the filtering element without flaking, chipping, or breaking of the filter plate. In addition, most filter plates capable of use with vacuum filtration require frequent backwashing to maintain their efficacy.

The effectiveness of the sludge treatment process depends greatly upon the efficiency of the filtering medium. Efficiency comprises two separate but related functions of the filtering medium. First, the filter medium should permit maximum speed in the dewatering process; that is, permit rapid reduction of volume and moisture content of the sludge to yield a handleable, relatively dry sludge cake. Second, the filtering medium must product a clear, clean, relatively solid-free effluent during the rapid dewatering process.

Clearly, filtering medium characteristics and properties profoundly affect the overall efficiency and cost of sludge treatment facilities. There is a need in the sludge treatment industry for a permanent filtering medium that provides fast, efficient dewatering and yet retains its structural integrity during repeated mechanized removal of the sludge cake. Many known filter media variously suffer from the disadvantage of meeting one of these requirements but not all of them, or are effective with a few types of sludges but not with a wide variety of sludge types.

2. Description of the Prior Art

U.S. patent application Ser. No. 202,241, filed Oct. 30, 1980 by Morris M. Riise and assigned to applicant's assignee's licensor, and its precursor applications, teach the use of a rigid filter plate in a sludge dewatering system. The filter plate disclosed therein comprises a monolithic multilayer filter plate. The term "monolithic" is used to denote a rigid unified structure. The applications teach using an upper layer filtering element composed of sharp pointed particulate matter roughly uniform in size. The sharp, upwardly extending points on the upper surface of the filtering element are emphasized as desirable to spear flocculated sludge masses. The filter plate provides a rigid structure through the application of epoxy to bind the plate's particle components. However, it has been discovered that filter plates prepared in accordance with the teachings of these applications develop bare spots on the upper surface of the filtering element with repeated use, and that either scraping of the surface with front end loaders or hosing off of the surface under very high pressure to clean the surface results in chipping of the filter plates.

U.S. Pat. No. 4,190,534 to Wyatt teaches the use of a multilayer filter bed for filtering and removing sludge materials suspended in the waste water by-product of steel pickling operations. The patentee describes using sharp pointed particles to form the exposed surface of the filter. These sharp pointed particles spear the larger sludge masses during filtering. Neither the particulate material constituting each layer of this filter nor the layers themselves are bonded by an adhesive bonding agent. Such a filter does not possess enough rigidity, strength, or durability to permit mechanized removal of sludge cakes by heavy equipment such as front end loaders. Also, cleaning the filtering element involves removal of its exposed surface. The patentee gives no indication regarding the suitability of the filtering medium for those rapid dewatering systems which employ vacuum filtration means.

A technical bulletin from Filtros, Inc. discusses use of ceramically bonded fused alumina for filter underdrain plates. Although the bulletin illustrates the use of porous ceramically bonded underdrain plates in a water filtering system, the main filtering element is loose sand. This system bears little relation to the present invention.

U.S. Pat. No. 3,011,643 to McCoy teaches a sand filter apparatus for swimming pool applications utilizing a bonded lower support structure for the single layer of filtering sand. This filter is not used for sludge dewatering. It employs a single layer filtering medium composed of loose sand. There is no teaching or suggestion of vacuum filtration compatible with the disclosed filter. The single layer filtering medium is not bonded by an adhesive bonding agent nor does it possess an exposed surface of sharp pointed particles. U.S. Pat. Nos. 3,847,808; 3,771,655; and 3,615,019 are of similar scope and are drawn from related subject matter areas but are less pertinent.

U.S. Pat. No. 3,166,615 to Farrell teaches a method of manufacturing a bonded multilayer porous structure capable of use as a mold for vacuum forming of pulp products. The disclosed invention is not related to sludge dewatering. The patentee does not disclose the use of sharp pointed particles on the exposed surface of the filtering medium or an underlying support structure comprising particulate material bonded by an adhesive bonding agent. U.S. Pat. Nos. 3,056,704; 2,293,099; 2,155,016; and 1,844,528 are drawn from the art related to bonding processes for minute particulate matter but are less pertinent.

SUMMARY OF THE INVENTION

Until now no monolithic multilayer filtering medium for sludge treatment capable of withstanding the stresses and scraping action of repeated mechanized removal of the dried sludge has provided efficient means of producing handleable, relatively dry sludge cakes from a wide variety of types of sludges while maintaining a filtering action that produces clear, clean (relatively solid-free) effluent.

The present invention embodies an improved rigid filter plate for sludge dewatering and an inventive process for manufacturing such a plate. The improved filter plate is capable of essentially permanent installation in rapid sludge dewatering systems employing mechanical means for sludge cake removal.

The improved rigid filter plate has at least two layers bonded together, a filtering element and a supporting element. The filtering element is relatively thin, preferably between about ⅛ inch and 2 inches thick, most preferably about ¼ inch thick, and comprises at least two sizes of jagged, irregular, inert hard particles adhesively bonded together. The particles are selected from the group consisting of aluminum oxide, corundum, emery, garnet, silicon carbide, boron carbide, and manufactured crystalline alumina products. The upper surface of the filter element is flat and dense, and the particles are oriented within the element with average particle size increasing from the upper surface to the lower surface of the filter element. The preferred range from which particles of desired sizes may be selected is 8 grid to 100 grid.

A supporting element, preferably about ¼ to about 3¾ inches thick, consists of particles larger in diameter than the particles of the filtering element. Preferably, the particles of the supporting element range from ⅛ to 1¼ inches in diameter. The supporting element particles are also adhesively bonded together, and the supporting element is adhesively bonded to the lower surface of the filtering element. The supporting element may be reinforced.

The improved rigid filter plate for sludge dewatering is manufactured by a unique process. The method of assembly utilizes an unexpectedly advantageous surface smoothing operation. The first step of the process involves mixing the larger particles for the supporting element with the appropriate amount of adhesive bonding agent. This step is followed by charging the mixture into the filter plate mold and tamping the mixture. Then the particles of the filtering element are mixed with the adhesive bonding agent and introduced into the mold on top of the supporting element layer. The upper surface of the filtering element is carefully smoothed with smoothing means. Finally, the entire mixture is tamped again, and the adhesive bonding agent is allowed to cure.

A principal object of this invention is to provide an improved rigid filter plate for sludge dewatering that possesses the strength and durability to withstand repeated removal of sludge cakes using heavy mechanized equipment and other physically abrasive means traversing the filter plate surface. The problem of destroying the structural integrity of the filter surface during sludge cake removal is avoided.

An additional object of this invention is to provide an improved rigid filter plate capable of fast and efficient sludge dewatering while requiring substantially smaller amounts of the polymer agent used to coagulate and floc the sludge to be filtered.

Another object of this invention is to provide an improved rigid filter plate for sludge dewatering that can be used under vacuum filtration, wherein the problem of sludge masses being pulled into the larger voids, thus clogging or blinding the filter, is overcome.

It is a further object of this invention to provide an improved rigid filter plate for sludge dewatering that utilizes a filtering element permitting rapid filtration of waste water having sludge contents ranging from 0.1% to 10% solids.

An additional object of this invention is to provide an improved rigid filter plate for sludge dewatering that produces a clean, clear effluent having suspended solids ranging from 2 to 175 parts per million, preferably 2 to 10 parts per million (a capture rate of 99.99%), from a wide variety of sludges.

It is also an object of this invention to provide an improved rigid filter plate having a filtering element wherein exposed jagged irregular, hard particles will spear the larger sludge masses during gravity filtration forming a secondary chemical filter, while at the same time providing a surface able to be more easily installed and completely cleaned during removal of the sludge.

It is a further object of this invention to provide a method of manufacturing an improved rigid filter plate having the above-described advantages.

These and other objects and advantages to our present invention will become apparent from the following description of the preferred embodiments of our invention, described in connection with the accompanying drawings.

BRIEF DESCRIPTION OF THE DRAWINGS

To enable the invention to be more readily understood, several drawings are included in this specification in which.

DESCRIPTION OF THE PREFERRED EMBODIMENTS

Figure 1:
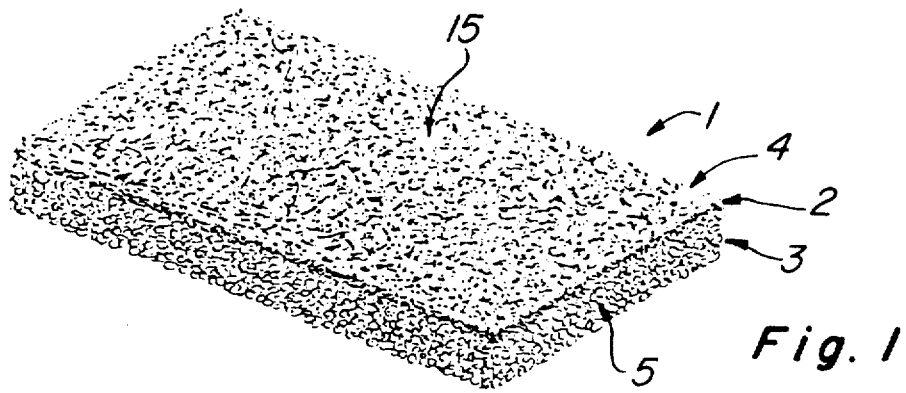
FIG. 1 is a pictorial view of an improved rigid filter plate made in accordance with the present invention.

Referring to the embodiment shown in FIGS. 1 and 2, an improved rigid filter plate 1 for sludge dewatering is shown. The filter plate 1 is a monolithic structure comprising at least two layers, the top layer of the filter plate being the filtering element 2, and the bottom layer being the supporting element 3. While, if desired, additional layers may be added to the plate for support, levelling, or other reasons, such is not necessary.

The filtering element 2 is a flat, relatively thin layer comprised of at least two sizes of jagged, irregular hard inert particles 4 adhesively bonded together, with increasing average particle size progressing from the upper surface to the lower surface of the filtering element. The supporting element 3 consists of larger particles 5 conveniently of substantially uniform size, also adhesively bonded together and to the filtering element.

Figure 2A:
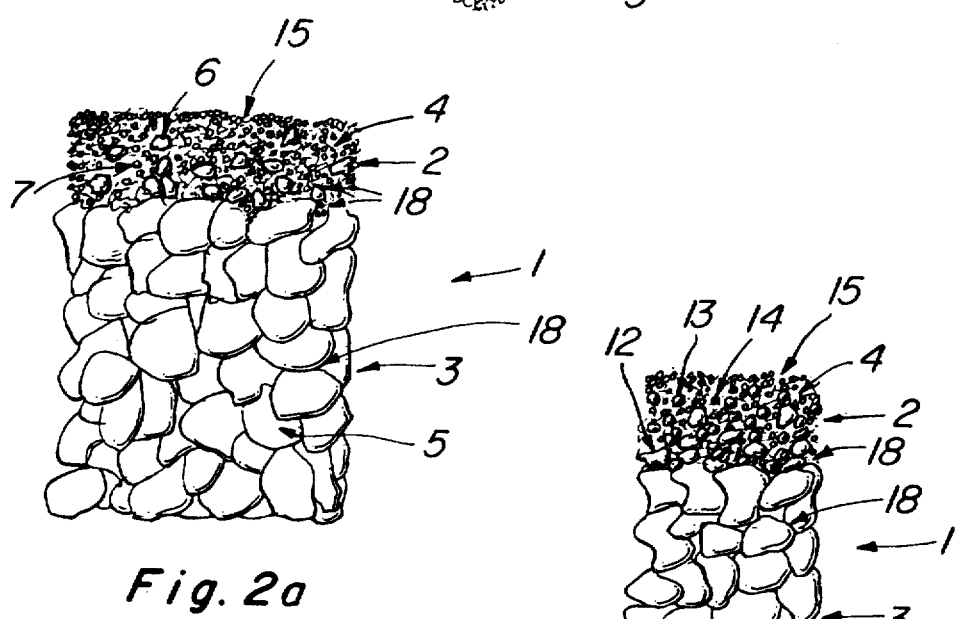
FIGS. 2 a, b, and c are partial vertical cross-sectional views of the filtering element and supporting element of an improved rigid filter plate.

The filtering element 2 may range in thickness from about ⅛ inch to about 2 inches and is preferably about ¼ inch thick. The range of sizes from which the jagged, irregular hard particles 4 of the filtering element may be selected consists essentially of from about 8 to about 100 grid. While small amounts of particles outside this size range may be included without deleterious effect, they provide no particular advantages. Referring to FIG. 2a, the filtering element may contain as few as two different particle sizes 6, 7, and referring to FIG. 2c, as many as four 8, 9, 10, 11 or more different sizes. Three of sizes 12, 13, 14 are preferred, see FIG. 2b, since this simultaneously provides good filter element integrity and satisfactory sludge dewatering rate. Four sizes of particles are required only for the dewatering of very fine sludges. Use of excessive amounts of small particles in the filtering element restricts the flow of filtrate and lengthens dewatering time. Representative sizes of particles which may be conveniently used in varying amounts in filtering elements intended for use with different sludges include 8, 10, 12, 16, 54 and 100 grid. "Grid" as used herein refers to American National Standard Institute (ANSI) grid size, in which, e.g., 12 grid particles have average diameter 0.063 inch; 16 grid, 0.043 inch; 54 grid, 0.012 inch; 100 grid, 0.0048 inch, etc.

With two or more and preferably three sizes of particles in the filtering element, a wider range of sludges may be dewatered using the improved rigid filter plate as compared with filter media having a single size of particulate matter on the filtering surface. Types of sludges which may be dewatered with the versatile inventive filter plates include municipal, water treatment and many industrial sludges ranging from 0.1% weight up to 10% weight solids or higher.

Figure 2B:
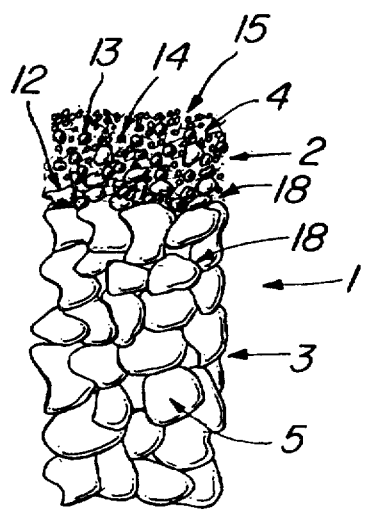
Figure 2C:
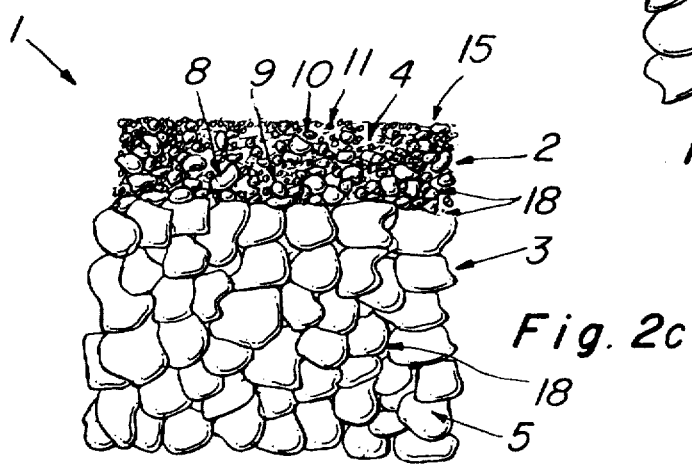

Referring to FIG. 2b, a partial vertical cross-sectional view of one embodiment of the improved rigid filter plate 1 for sludge dewatering is shown. As illustrated in FIG. 2b, three sizes of particles 12, 13, 14 are used in the filtering element 2, and a greater percentage of the smaller jagged, irregular hard particles 14 are found near the exposed upper (filtering) surface of the element. Proceeding through the filtering element toward the supporting element, a greater number of the larger sizes 12, 13 of jagged, irregular hard particles are encountered. Put differently, the average particle size increases proceeding from the upper surface toward the lower surface of the filtering element; however, distinct strata do not appear, and some particles of each size appear at each level. FIGS. 2a, and 2c illustrate this same point for filtering elements having two and four sizes of particles, respectively.

The filter plate possesses an unusually dense surface 15 that has few, if any, large valleys or crevices in which larger sludge masses could be trapped. Contrary to the expectations arising from the teachings of Ser. No. 202,241, filed Oct. 30, 1980, this more uniform surface does not destroy the secondary filtering ability of the filtering elements. That is, the filter element is still able to trap large sludge masses early in the sludge dewatering process, which then act themselves as an additional level of filter, even though the sharp, upwardly extending points of the filter upper surface are less prominent in the improved filter plates.

Furthermore, the surface of the improved filter plate is far more durable, resisting flaking and chipping, than the surface of the plates described in Ser. No. 202,241. While applicants should not be held to any specific explanation for this phenomenon, it is believed that it may result from the increased number of contact points between different sized particles, resulting in increased points of bonding between them. Thus, even though the filtering element is only about ¼ inch thick, it is able to stand up to repeated scraping during sludge removal.

The denser, more filled-in surface of the filtering element permits easier and more complete removal of the dried sludge from the filter surface because there are fewer crevices were sludge could remain imbedded during removal operations.

The particles of the filtering element, in addition to having a jagged, irregular external form, must be very hard in order to withstand repeated sludge removal and cleaning of the filter upper surface. The particles are preferably selected from the group consisting of aluminum oxide, corundum, emery, garnet, silicon carbide, boron carbide, and manufactured crystalline alumina products sold under various trade names such as Borolon (Abrasive Co.), Aloxite (Carborundum Co.), Lionite (General Abrasive Co.) and Alundum (Norton Co.). Each of these materials has a Mohs hardness of about 7.5 or greater. Reported Mohs hardness for corundum is 9, for emery 9, for garnet 7.5+, for silicon carbide 9.3 to 9.7, for boron carbide 9.5 to 9.8, and for crystalline alumina 9. Each of these materials as commercially available for abrasive use is composed of jagged, irregular particles. Silica sand is of high hardness but is composed of particles which are too rounded, i.e., insufficiently jagged, for use in the present invention.

Figure 3:
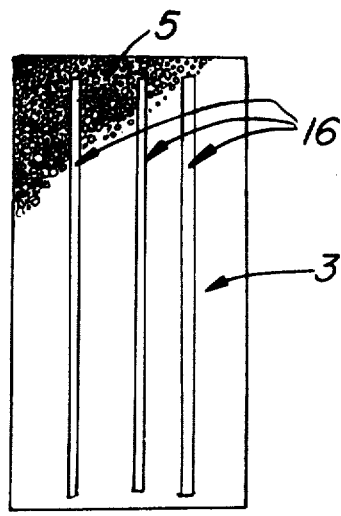
FIG. 3 is a horizontal cross-sectional view of the supporting element of a filter plate of the invention reinforced with rods.
Figure 4:
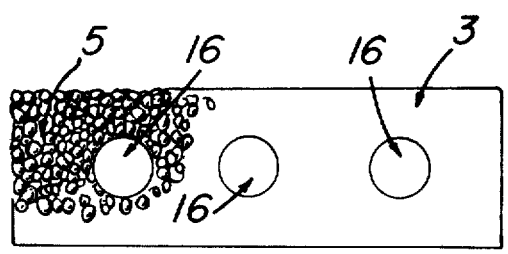
FIG. 4 is a vertical cross-sectional view of the same supporting element reinforced with rods.
Figure 5:
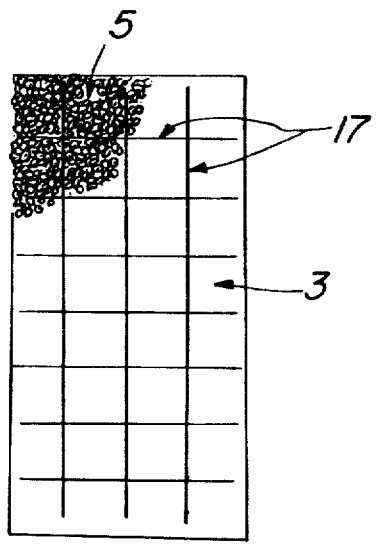
FIG. 5 is a horizontal cross-sectional view of the supporting element of a filter plate of the invention reinforced with wire mesh.

The supporting element 3 is preferably about ¼ to about 3¾ inches thick. The particles 3 which are adhesively bonded together to constitute the supporting element are conveniently substantially uniform in size, but may vary in diameter, and will preferably be within the range of from about ⅛ to about 1¼ inches. The supporting element 3 may also incorporate a reinforcing means within it, such as reinforcing bars or metal mesh. Examples of reinforcing means, illustrated in FIGS. 3–5, are steel rods 16 at least ⅜ inch in diameter spaced 6 inches apart, or steel mesh 6 inches by 6 inches 17. (In these Figs., only a portion of the particles of the supporting element are depicted for purposes of clarity. Naturally, in actual fact, the particles are distributed throughout the layer.) Preferably, the reinforcing means is situated in about the center or bottom of the vertical dimension (thickness) of the supporting element. The particulate material used in the supporting element is preferably washed and kiln dried pea gravel such as Chattahoochie gravel.

The particles within each layer and the layers themselves are bonded together with an adhesive bonding agent 18. The adhesive bonding agent is preferably a low viscosity epoxy resin and hardener product such as Futura Bond (private labelled by Futura from the Dow Chemical Co.). In geographical areas where the filter plates will be exposed to high ambient temperatures, e.g., 90° F., in use, resulting in plate temperatures of as high as 140° F., an epoxy intended for high temperature applications should be employed to avoid bending of the filter plates. Where the filter plates are to be used in drinking water treatment plants, the epoxy employed should be selected from among those approved by the FDA as non-toxic.

In general, the method of manufacturing the improved rigid filter plates involves placing the supporting element particles mixed with an adhesive bonding agent into a filter plate mold to form the supporting element first, followed by tamping. Then two or more sizes of jagged, irregular hard particles are mixed with an adhesive bonding agent and added to the filter plate mold on top of the supporting element layer and the entire mixture is carefully smoothed and tamped.

The supporting element mixture is made by mixing a low viscosity epoxy and hardener until the proper viscosity has been reached, and then mixing a quantity of inert particles, preferably washed and kiln dried gravel or aggregate, conveniently of substantially uniform size, within the range of ⅛ to 1¼ inch diameter, with the adhesive bonding agent. The appropriate weight ratio of particles to adhesive bonding agent ranges from 6:1 to 15:1. The appropriate ratio varies with the size of the particles; too much bonding agent fills the interstices between the particles, giving a solid mass with no flow-through of filtrate permitted; too little gives a weak supporting layer due to lack of bonding at some of the contact points between the particles. The supporting element mixture is then poured into the filter plate mold, for example, a heavy tool steel mold measuring 2 feet by 4 feet, to a depth of preferably about ¼ to about 3¾ inches. Should a reinforced filter plate be desired, reinforcing means such as reinforcing rods or sections of metal mesh treated to removal scale and prevent rust (e.g., by dipping in epoxy) are placed in the mold, preferably after pouring in about half the supporting element mixture, and the remaining supporting element mixture is added thereafter. The mixture is then tamped.

The filtering element mixture is made by mixing the epoxy and hardener as described above and combining it with a quantity of jagged, irregular hard particles of at least two sizes selected from the range consisting essentially of 8 grid to 10 grid. The compositions of the particles are as described above. The appropriate weight ratio of particles to adhesive bonding agent ranges from 8:1 to 20:1. The exact amount to be used for any particular application should be determined in accordance with the same considerations set forth for the supporting element. The resulting mixture is poured into a filter plate mold, to a depth of about ⅛ inch to about 2 inches, on top of the supporting element. As the mixture of filtering element particles and adhesive bonding agent is poured onto the supporting element layer, the particles will fit into any gaps between the comparatively larger particles of the supporting element, resulting in a degree of "interlocking" between the two layers and yielding a tighter bond. See FIG. 2.

The final steps of the process include smoothing the upper surface of the filter plate carefully with smoothing means, for example by drawing a levelled metal bar across the surface, tamping the surface carefully to align the particles, and permitting the plate to cure.

The improved rigid filter plates made by the above-described process are intended for use in a dewatering system for semi-liquid sludge, such as the type of system described in U.S. patent application Ser. No. 202,241, filed Oct. 30, 1980. The disclosure of Ser. No. 202,241 is incorporated by reference herein. The dewatering system comprises a liquid impermeable container having a sidewall construction defining an upwardly open box-like area. Although the inventive filter plates may be placed directly on the floor of this container without any other support, typically, 1 to 1½ inch diameter stone is laid down on the floor of this container and vibrated or keyed into position. On top of this may be placed 1 inch kiln dried gravel sprayed with a thinned epoxy (e.g., Futura Bond thinned with xylene) to set the upper surface and give a hard base. Then an additional 1 inch of levelling gravel is put down to compensate for any irregularity in the bottom surfaces of the filter plates. The filter plates are preferably installed by laying them edge to edge, and the joints between the plates are filled with a sealant (e.g., epoxy with silica sand filter) and/or an expansion material. Installation is facilitated by the rigorously flattened upper surface of the filter plates, which permits exact matching of plate level as the plates are laid edge to edge. The result is an uninterrupted smooth filter surface across the sludge container.

The process for dewatering sludge in which the improved filter plates may be used would typically comprise:

(a) where required, pretreating the sludge to coagulate and floc it to form soft sludge masses of various sizes, including larger and smaller sludge masses;

(b) passing the flocced sludge onto the upper surface of the filter plate;

(c) permitting the larger sludge masses to settle by force of gravity so that they are impaled on the jagged, irregular projections of the particles on the upper surface of the filtering element and form a layer over the top of the filter plate;

(d) thereafter applying a vacuum, preferably of between 1 and 27 inches of mercury and most preferably of between 10 and 15 inches of mercury, of sufficient strength to draw filtrate from the sludge through the layer of larger sludge masses on the surface of the filter plate and through the filter plate, but not so strong as to break down the larger sludge masses, such that the smaller sludge masses are trapped by the already settled larger sludge masses, until the sludge is dewatered to an extent making it removable by mobile disposal means;

(e) removing the sludge from the surface of the filter plate by mobile disposal means; and (f) cleaning off the upper surface of the filter plate by spraying, hosing down, or other such means. Backwashing of the inventive filter plates is not generally required.

The improved rigid filter plate disclosed herein provides some distinct advantages when used with the sludge dewatering system described above. The hard, dense, uniformly compacted filter surface lends strength and durability to the improved plate permitting mechanized sludge removal by heavy equipment which traverses the filter plate surface, without chipping or flaking of the surface. Examples of equipment which might be used to remove the sludge include front end loaders, vacuums, shovels, and mechanized scrapers. Examples of equipment which may be used to clean off the plate upper surface include hoses and mechanized sprayers.

The improved rigid filter plate provides fast and efficient sludge dewatering for a wide variety of sludges, while requiring substantially smaller amounts of the polymer agent used to coagulate and floc the sludge to be filtered. The filter plate also permits easier and more complete removal of the dried sludge cake from the filter surface.

The improved rigid filter plate described above is capable of application in a wide variety of sludge dewatering operations. Wide flexibility of application is achieved by varying the distribution of sizes of the jagged, irregular hard particles in the filtering element. Each sludge to be dewatered should be analyzed for type and particle size. In general, the finer the sludge (the smaller the sludge particles) the smaller the sizes of particles which should be used in the filtering element to yield a particular cleanliness of filtrate. This is usually the case for less concentrated sludges also. The selection of filter plate compositions for various sludge dewatering applications are illustrated by the following examples.

EXAMPLE I

Particle size and water retention are determined for municipal sludge, i.e., aerobic, anaerobic, waste activated or food processing sludge. An improved rigid filter plate to dewater such sludge utilizes a filtering element composed of jagged, irregular aluminum oxide particles where 90% of the particles are 16 grid and 10% of the particles are 54 grid. Another distribution of aluminum oxide particles where 70% of the particles are 16 grid, 20% of the particles are 54 grid, and 10% of the particles are 100 grid is also successful in municipal sludge dewatering systems. This type of improved rigid filter plate is classified for convenience as a coarse filter.

EXAMPLE II

For fine particle sludge such as water treatment plant sludge, metal sludges, and galvanizing plant sludges, (e.g., lime, alum and other metal hydroxide sludges), a number of filtering element compositions can be successfully employed for various sizes and shapes of sludge particles. One such composition is an aluminum oxide layer where 10% of the particles are 16 grid, 60% of the particles are 54 grid, and 30% of the particles are 100 grid. Another distribution uses aluminum oxide particles where 20% are 16 grid, 70% are 54 grid, and 10% are 100 grid. A third, comprising three sizes of aluminum oxide particles where 45% of the particles are 16 grid, 45% of the particles are 54 grid, and 10% of the particles are 100 grid, is classified for convenience as a fine filter.

EXAMPLE III

To dewater tin and zinc mine tailings, sand and gravel slimes, and sulfur dioxide scrubber sludges the filtering element is composed of corundum, emery, or garnet particles where 10% of the particles are 12 grid, 40% of the particles are 16 grid, 40% of the particles are 54 grid, and 10% of the particles are 100 grid. The supporting element particulate matter is of diameter ⅛ inch to 1 inch.

EXAMPLE IV

A filtering element of manufactured crystalline alumina particles where 40% are 12 grid, 40% are 16 grid, 10% are 54 grid, and 10% are 100 grid can be used to dewater phosphate slimes. Sizes of the particulate matter in the supporting element are ⅛ to 1 inch. Phosphate slimes can also be dewatered using the filter plate of Examples III or V.

EXAMPLE V

Paper mill sludges and biomass/alcohol production sludges are efficiently dewatered using a filtering element composed of silicon carbide or boron carbide particles where 80% of the particles are 12 grid, 10% of the particles are 54 grid, and 10% of the particles are 100 grid. Sizes of the particulate matter in the supporting element are ⅛ to 1 inch.

EXAMPLE VI

Using a filtering element of aluminum oxide particles where 20% of the particles are 16 grid, 70% of the particles are 54 grid, and 10% of the particles are 100 grid, the improved rigid filter plate is capable of dewatering four types of coal slimes ranging from chunk coal to very fine coal having 70% suspended solids less than 60 microns in diameter.

EXAMPLE VIII

An aerobic sludge of solids content 1.8% is treated with 50 ml Nalco 7120 polymer at 5% dilution. The flocced sludge is dewatered over an improved filter plate of jagged, irregular aluminum oxide particles in which 45% are 16 grid, 45% are 54 grid, and 10% are 100 grid. The filtrate is very clear throughout the dewatering process, detailed in Table I, and the solids content of the dried sludge is 16.3% at 24 hours.

| SLUDGE TEST DATA FOR EXAMPLE VII | | |
|---|---|---|
| Type of Sludge filtered: Aerobic | | |
| Polymer Coagulant used: 50 ml Nalco 7120 (5% dilution) | | |
| Elapsed Filtering Time | Relative Sludge Height (cm) | |
| 0 min. | 24.5 | |
| 5 min. | 20.8 | |
| 10 min. | 19.7 | |
| 15 min. | 18.8 | |
| 20 min. | 18.0 | |
| 25 min. | 17.2 | |
| 30 min. | 16.5 | Vacuum on |
| 35 min. | 15.5 | |
| 40 min. | 14.3 | |
| 45 min. | 13.4 | |
| 1 hr. 35 min. | 7.4 | |
| 1 hr. 50 min. | 6.6 | |
| 2 hrs. | 5.9 | |
| 2 hrs. 15 min. | 5.4 | |
| 2 hrs. 25 min. | 5.1 | Vacuum off |
| 2 hrs. 30 min. | 5.0 | |
| 2 hrs. 45 min. | 5.0 | |
| 3 hrs. | 5.0 | |
| 23 hrs. | 5.0 | |
| 24 hrs. | 5.0 | |

Solids content at 0 min.: 1.8%
at 24 hrs.: 16.3%

The relative durability of the improved rigid filter plates as compared with the plates of Ser. No. 202,241 is illustrated by the following comparative examples.

Comparative Example VIII

A filter plate is molded with at least one supporting layer and a filtering layer of 16 grid anthracite bonded with epoxy. The plates are installed and used repeatedly for sludge dewatering. Removal of the dried sludge with front end loaders results in chipping and flaking of the upper surface of the filtering element, so that bare spots rapidly appear. Cleaning of the surface with water under high pressure also flakes off anthracite particles.

Under comparable conditions of use, the filter plate of Example VII remains intact.

Comparative Example IX

A filter plate is molded with at least one supporting layer and a filtering layer of 16 grid aluminum oxide bonded with epoxy. The plates are installed and used repeatedly for sludge dewatering. Removal of the dried sludge with front end loaders results in chipping and flaking of the upper surface of the filtering element, so that bare spots rapidly appear. Cleaning of the surface with water under high pressure also flakes off aluminum oxide particles.

Under comparable conditions of use, the filter plate of Example VII remains intact.

The following example illustrates the structural strength of the inventive filter plates.

EXAMPLE X

Tests on the improved rigid filter plate 4 feet by 2 feet by 2 inches, without a reinforcing means in a flexural type mode with reaction blocks on 25 cm from center and top loading block midway between the reaction blocks revealed that the filter plate could withstand 3,000 pounds of flexural stress before failure. With a reinforced supporting element, the tests conducted on a 4 feet by 2 feet by 2 inch filter plate with reinforcing means of ⅜ inch steel rods or 6 inch by 6 inch steel mesh revealed strength ranging from 4,400 pounds to 14,900 pounds before failure. In addition, tests conducted on a 7.5 inch diameter round section of the unreinforced filter plate revealed a compressibility strength ranging from 1,660 psi to 3,072 psi.

Satisfactory integrity of the improved rigid filter plates in winter climates and compatibility of the expansion-contraction ratios of the plates with other building materials, e.g., concrete, glass, steel and fiberglass, have also been demonstrated.

While in the foregoing, there has been provided a detailed description of particular embodiments of the present invention, it is to be understood that all equivalents obvious to those skilled in the art are to be included within the scope of the invention, as claimed.

What is claimed is:

1. An improved rigid sludge dewatering filter plate comprising at least two layers;
    the first layer comprising a thin, flat filtering element having an exposed, dense upper surface and a lower surface;
    said filtering element consisting essentially of jagged, irregular particles of one or more substances selected from the group consisting of aluminum oxide, corundum, emery, garnet, silicon carbide, boron carbide and manufactured crystalline alumina products, bonded together with an adhesive bonding agent, wherein the particles are of at least two sizes within the range consisting essentially of about 8 grid to about 100 grid and are oriented with average particle size increasing from the upper surface to the lower surface of the filtering element; and
    the second layer being a supporting element comprised of particles larger than the largest particles used in the filtering element, bonded together and to the lower surface of the filtering element with an adhesive bonding agent.

2. An improved rigid sludge dewatering filter plate as in claim 1 wherein the jagged, irregular particles of the filtering element are of aluminum oxide.

3. An improved rigid sludge dewatering filter plate as in claim 1 wherein the jagged, irregular particles of the filtering element are of three grid sizes within the range consisting essentially of about 8 grid to about 100 grid.

4. An improved rigid sludge dewatering filter plate as in claim 1 wherein the jagged, irregular particles of the filtering element are of four grid sizes within the range consisting essentially of about 8 grid to about 100 grid.

5. An improved rigid sludge dewatering filter plate as in claim 1 wherein the thickness of the filtering element is between about ⅛ inch and 2 inches.

6. An improved rigid sludge dewatering filter plate as in claim 1 wherein the thickness of the supporting element is between about ¼ and about 3¾ inches.

7. An improved rigid sludge dewatering filter plate as in claim 1 wherein the supporting element is composed of particles ranging in diameter from ⅛ to 1½ inches in diameter.

8. An improved rigid sludge dewatering filter plate as in claim 1 wherein the supporting element is reinforced with reinforcing means.

9. An improved rigid sludge dewatering filter plate as in claim 8 wherein the reinforcing means is steel bars located within the supporting element.

10. An improved rigid sludge dewatering filter plate as in claim 8 wherein the reinforcing means is wire mesh located within the supporting element.

11. An improved rigid sludge dewatering filter plate as in claim 1 wherein the jagged, irregular particles of the filtering element are arranged in a distribution of sizes such that about 90% of the particles are about 16 grid and about 10% of the particles are about 54 grid.

12. An improved rigid sludge dewatering filter plate as in claim 1 wherein the jagged, irregular particles of the filtering element are arranged in a distribution of sizes such that about 70% of the particles are about 16 grid, about 20% of the particles are about 54 grid, and about 10% of the particles are about 100 grid.

13. An improved rigid sludge dewatering filter plate as in claim 1 wherein the jagged, irregular particles of the filtering element are arranged in a distribution of sizes such that about 45% of the particles are about 16 grid, about 45% of the particles are about 54 grid, and about 10% of the particles are about 100 grid.

14. An improved rigid sludge dewatering filter plate as in claim 1 wherein the jagged, irregular particles of the filtering element are arranged in a distribution of sizes such that about 20% of the particles are about 16 grid, about 70% of the particles are about 54 grid, and about 10% of the particles are about 100 grid.

15. An improved rigid sludge dewatering filter plate as in claim 1 wherein the jagged, irregular particles of the filtering element are arranged in a distribution of sizes such that about 10% of the particles are about 16 grid, about 60% of the particles are about 54 grid, and about 30% of the particles are about 100 grid.

16. An improved rigid sludge dewatering filter plate as in claim 1 wherein the jagged, irregular particles of the filtering element are arranged in a distribution of sizes such that about 10% of the particles are about 12 grid, about 40% of the particles are about 16 grid, about 40% of the particles are about 54 grid, and about 10% of the particles are about 100 grid.

17. An improved rigid sludge dewatering filter plate as in claim 16 wherein the weight ratio of adhesive bonding agent to particles in the filtering element is between about 1:8 and about 1:20 and the weight ratio of adhesive bonding agent to particles in the supporting element is between about 1:6 and about 1:15.

18. An improved rigid sludge dewatering filter plate as in claim 1 wherein the jagged, irregular particles of the filtering element are arranged in a distribution of sizes such that about 40% of the particles are about 12 grid, about 40% of the particles are about 16 grid, about 10% of the particles are about 54 grid, and about 10% of the particles are about 100 grid.

19. An improved rigid sludge dewatering filter plate as in claim 1 wherein the jagged, irregular particles are arranged in a distribution of sizes such that about 80% of the particles are about 12 grid, about 10% of the particles are about 54 grid, and about 10% of the particles are about 100 grid.

20. An improved rigid sludge dewatring filter plate as in claim 1 wherein the adhesive bonding agent is a mixture of a low viscosity epoxy resin and a hardener.

21. A method of manufacturing an improved rigid sludge dewatering filter plate which comprises:
    (a) mixing an adhesive bonding agent with inert particles of diameter greater than 8 grid to form a supporting element mixture;
    (b) introducing the supporting element mixture into a filter plate mold to a predetermined depth;

(c) tamping the supporting element mixture in the mold;

(d) mixing an adhesive bonding agent with jagged, irregular particles of at least two sizes within the range consisting essentially of 8 grid to 100 grid, wherein the particles are comprised of one or more materials selected from the group consisting of aluminum oxide, corundum, emery, garnet, silicon carbide, boron carbide and manufactured crystalline alumina products, to form a filtering element mixture;

(e) introducing the filtering element mixture into the filter plate mold to a predetermined depth of between about ⅛ inch and about 2 inches on top of the tamped supporting element mixture;

(f) smoothing the upper surface of the filtering element mixture with smoothing means;

(g) tamping the filtering element mixture in the mold; and (h) curing the resulting filter plate.

22. The method of manufacturing an improved rigid sludge dewatering filter plate as in claim 21 further comprising the steps of mixing a low viscosity epoxy resin with a hardener to form the adhesive bonding agent employed in steps (a) and (d).

23. The method of manufacturing an improved sludge dewatering filter plate as in claim 21 wherein the jagged, irregular particles of the filtering element are of aluminum oxide.

24. The method of manufacturing an improved rigid sludge dewatering filter plate as in claim 21 wherein the jagged, irregular paticles of the filtering element are of three grid sizes within the range consisting essentially of about 8 grid to about 100 grid.

25. The method of manufacturing an improved rigid sludge dewatering filter plate as in claim 21 wherein the jagged, irregular particles of the filtering element are of four grid sizes within the range consisting essentially of about 8 grid to about 100 grid.

26. The method of manufacturing an improved rigid sludge dewatering filter plate as in claim 21 wherein the thickness of the filtering element is between about ⅛ inch and 2 inches.

27. The method of manufacturing an improved rigid sludge dewatering filter plate as in claim 21 wherein the thickness of the supporting element is between about ¼ inch and about 3¾ inches.

28. The method of manufacturing an improved rigid sludge dewatering filter plate as in claim 21 wherein the supporting element is composed of particles ranging in diameter from about ⅛ inch to about 1½ inches in diameter.

29. The method of manufacturing an improved rigid sludge dewatering filter plate as in claim 21 wherein the jagged, irregular particles of the filtering element are arranged in a distribution of sizes such that 90% of the particles are 16 grid and 10% of the particles are 54 grid.

30. The method of manufacturing an improved rigid sludge dewatering filter plate as in claim 21 wherein the jagged, irregular particles of the filtering element are arranged in a distribution of sizes such that about 70% of the particles are about 16 grid, about 20% of the particles are about 54 grid, and about 10% of the particles are about 100 grid.

31. The method of manufacturing an improved rigid sludge dewatering filter plate as in claim 21 wherein the jagged, irregular particles of the filtering element are arranged in a distribution of sizes such that about 45% of the particles are about 16 grid, about 45% of the particles are about 54 grid, and about 10% of the particles are about 100 grid.

32. The method of manufacturing an improved rigid sludge dewatering filter plate as in claim 21 wherein the jagged, irregular particles of the filtering element are arranged in a distribution of sizes such that about 20% of the particles are about 16 grid, about 70% of the particles are about 54 grid, and about 10% of the particles are about 100 grid.

33. The method of manufacturing an improved rigid sludge dewatering filter plate as in claim 21 wherein the jagged, irregular particles of the filtering element are arranged in a distribution of sizes such that about 10% of the particles are about 16 grid, about 60% of the particles are about 54 grid, and about 30% of the particles are about 100 grid.

34. The method of manufacturing an improved rigid sludge dewatering filter plate as in claim 21 wherein the jagged, irregular particles of the filtering element are arranged in a distribution of sizes such that about 10% of the particles are about 12 grid, about 40% of the particles are about 16 grid, about 40% of the particles are about 54 grid, and about 10% of the particles are about 100 grid.

35. The method of manufacturing an improved rigid sludge dewatering filter plate as in claim 21 wherein the jagged, irregular particles of the filtering element are arranged in a distribution of sizes such that about 40% of the particles are about 12 grid, about 40% of the particles are about 16 grid, about 10% of the particles are about 54 grid, and about 10% of the particles are about 100 grid.

36. The method of manufacturing an improved rigid sludge dewatering filter plate as in claim 21 wherein the jagged, irregular particles are arranged in a distribution of sizes such that about 80% of the particles are about 12 grid, about 10% of the particles are about 54 grid, and about 10% of the particles are about 100 grid.

37. A method of manufacturing an improved rigid sludge dewatering filter plate as in claim 21 further comprising introducing a portion of the supporting element mixture into the filter plate mold, introducing reinforcing means on top of this, and then introducing the remainder of the supporting element mixture on top of the reinforcing means.

38. A method of manufacturing an improved rigid sludge dewatering filter as in claim 37 wherein the reinforcing means is steel bars located within the supporting element.

39. A method of manufacturing an improved rigid sludge dewatering filter plate as in claim 37 wherein the reinforcing means is wire mesh located within the supporting element.

* * * * *